United States Patent
Hill et al.

[11] 3,837,834
[45] Sept. 24, 1974

[54] PLANT REGULATOR COMPOSITIONS AND METHOD

[75] Inventors: Kenneth Lee Hill, Doylestown, Pa.; John Francis McCarthy, Medina, N.Y.

[73] Assignee: FMC Corporation, New York, N.Y.

[22] Filed: June 19, 1972

[21] Appl. No.: 264,022

Related U.S. Application Data

[63] Continuation-in-part of Ser. No. 843,853, July 22, 1969, abandoned, which is a continuation of Ser. No. 609,286, Jan. 12, 1967, abandoned.

[52] U.S. Cl.............................. 71/76, 71/86, 71/87
[51] Int. Cl.............................................. A01n 9/36
[58] Field of Search............ 71/86, 87, 76; 260/961, 260/545

[56] References Cited
UNITED STATES PATENTS

| | | | |
|---|---|---|---|
| 2,843,617 | 7/1958 | Kaufman | 260/461 X |
| 2,882,304 | 4/1959 | Weber | 260/961 X |
| 2,898,300 | 8/1959 | Norton et al. | 260/961 X |
| 2,927,014 | 3/1960 | Goyette | 71/86 |
| 3,094,405 | 6/1963 | Toy et al. | 71/87 |
| 3,209,020 | 9/1965 | Schrader | 260/961 X |
| 3,346,669 | 10/1967 | Regel | 260/960 |

FOREIGN PATENTS OR APPLICATIONS

| | | | |
|---|---|---|---|
| 1,099,535 | 8/1959 | Germany | 260/545 |

OTHER PUBLICATIONS

Jaron et al., Chem. Abst., Vol. 57, (1962), 10513i and pg. 374 Chem. Abst. Formula Index, Vol. 56–65.

*Primary Examiner*—Lewis Gotts
*Assistant Examiner*—Catherine L. Mills

[57] ABSTRACT

Chemical compounds of the formula

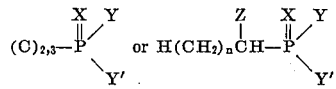

wherein $(C)_{2,3}$ represents a two or three carbon atom straight-chain hydrocarbon group; Z is hydroxy or acetoxy; n is 1 or 2; X is oxygen or sulfur; and Y and Y' represent substituents such that the compound is a phosphonic acid, monoester, oxide, salt, halide, or a corresponding sulfur compound; are effective in modifying growth and development of plants, particularly in retarding or arresting growth without killing the plants. Different types of plant regulator activity are exemplified.

12 Claims, No Drawings

PLANT REGULATOR COMPOSITIONS AND METHOD

CROSS REFERENCE TO RELATED APPLICATIONS

This application is a continuation-in-part of Ser. No. 843,853, filed July 22, 1969, now abandoned, which is a continuation of Ser. No. 609,286, filed Jan. 12, 1967, now abandoned.

This invention pertains to the general field of plant regulators and particularly to compositions which control and regulate plant growth by retarding or arresting said growth. Plant regulators are defined in the U.S. Department of Agriculture publication, *Interpretation Number 3 of the Regulations for the eh Enforcement of the Federal Insecticide, Fungicide, and Rodenticide Act* (Revision 1, Nov., 1964) at Section 362.101 (a) (11).

It is known that a variety of organophosphorus compounds exhibit herbicidal activity of varying types. For example, it is known that certain neutral diesters of phosphonic acids are useful for killing plants. However, the use of simple alkyl phosphonic acids and related acidic derivatives on plants has not been suggested for any purpose. The unusual plant responses, such as the inhibition and arrestation of growth, caused by the phosphonic acids and acid derivatives described herein, have not previously been reported or suggested.

This invention pertains to novel compositions for regulation of plant growth, comprising as an essential active ingredient certain phosphonic acids and acid derivatives, which compositions cause retardation or cessation of growth of a wide variety of plant species without causing death of the plants; and to the method of regulating the development of plants without killing the plants. The invention also pertains to certain phosphonic acids and acid derivatives which are new compounds and which are effective in the regulation of plant growth.

The active compounds of this invention are members of the class having the general formula:

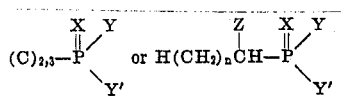

wherein $(C)_{2,3}$ represents a saturated or unsaturated straight-chain hydrocarbon group having two or three carbon atoms, such as ethyl, vinyl, propyl, 1-propenyl, allyl, 1-propynyl, or 2-propynyl, Z represents hydroxy or acetoxy, and n is 1 or 2. Y represents a halogen atom, preferably chlorine or bromine, or —XH or the anion —X⁻. Y' represents either any of the groups represented by Y or —XR, wherein the nature of R is not critical. Thus, R may be a saturated or unsaturated straight- or branched-chain alkyl, aryl, aralkyl, or cycloalkyl group of one to about twelve carbon atoms; for example, R may be methyl, ethyl, propyl, allyl, isopropyl, methallyl, butyl, sec-butyl, isobutyl, pentyl, neopentyl, crotyl, 2-ethylhexyl, phenyl, benzyl, cyclohexyl. In the general formula and in the above description, X represents oxygen or sulfur. Y and Y' may be taken together to represent an oxygen or sulfur atom which is doubly bonded to phosphorus. When Y is the anion —X⁻, the nature of the cation is not critical. Any organic or inorganic cation, not of itself phytotoxic, may be used to make the plant regulator compound of the invention electrically neutral. In electrically neutral form the substituent Y is thus represented by —XM, wherein M is the non-critical cation of a base. Typically M is the cation of a metal such as an alkali, alkaline earth, or transition metal, e.g. sodium, potassium, lithium, magnesium, calcium, zinc, aluminum, copper, iron, manganese, and the like. Typical of M as an organic cation are ammonium and substituted ammonium such as $H_mR_p'N^+$ wherein R' is an alkyl or aryl of 1 to 12 carbon atoms and m and p are each an integer from 0 to 4 such that m+p = 4, or a cyclic ammonium group such as morpholinium or piperidinium. Preferably, R' is a lower alkyl and the number of carbon atoms in M is 1 to 18. When the valence of the cation is greater than one, M represents a fractional portion of the cation equal to 1 divided by the valence of the cation so as to satisfy the single valence of the —X⁻ anion.

A particularly preferred group of compounds is represented by the formula:

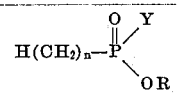

wherein Y is —OH or the anion —O⁻, n is the integer 2 or 3, and R represents a lower alkyl radical. In electrically neutral form the compound corresponding to the anion is a salt, and the Y substituent is —OM wherein M represents an inorganic or organic cation. While the nature of the cation is not critical, preferred metallic cations include sodium, potassium, calcium, zinc, copper, iron, and manganese. Preferred organic cations include ammonium groups of 0 to 12 carbon atoms of the formula $H_mR_p'N^+$ wherein R' is an alkyl of 1 to 12 carbon atoms, m and p are each an integer from 0 to 4 such that m+p = 4. When p is greater than one, the groups represented by R' may be the same or different. When the valence of the cation is greater than one, M represents a fractional portion of the cation equal to 1 divided by the valence of the cation so as to satisfy the single valence of the —O⁻ anion.

A number of procedures are known for the synthesis of compounds of this class of phosphonic acids and acid derivatives. For example, O,O-dialkyl phosphonates, the preparation of which is extensively described in the literature, may be subjected to partial hydrolysis with sodium hydroxide to give the monosodium salt of the corresponding phosphonate monoester which on acidification yields the corresponding monoacidic monoester RP (O) (OH) (OR'). Dialkyl phosphonates may be hydrolyzed under acid conditions such as with concentrated hydrochloric acid to give the corresponding diacidic compound RP (O) (OH)₂. Treatment of dialkyl phosphonates with phosphorus pentachloride gives the corresponding phosphonic dichloride, which on reaction with one equivalent of the appropriate alcohol in the presence of an acid acceptor gives the ester chloride R-P(O) (OR') (Cl). Reaction of the phosphonic dichloride with formic acid gives the corresponding phosphonic oxide. Neutralization of a mono- or diacid with an amine or metal hydroxide provides the corresponding salt. Sulfur analogs are readily pre-

EXAMPLE 1

Preparation of O-Ethyl Hydrogen Propylphosphonate a. Preparation of O,O-diethyl propylphosphonate:

To a mixture of 34.1 g of a 51.7 percent dispersion of sodium hydride in mineral oil and 200 ml anhydrous diethyl ether was added slowly a solution of 100 g of diethyl hydrogen phosphite in 200 ml ether, the rate of addition being such as to maintain reflux. Stirring was continued until evolution of hydrogen ceased. A solution of 89.3 g of 1-bromopropane was then added, and the mixture was heated under reflux overnight. Excess sodium hydride was decomposed by adding a few drops of ethanol and the mixture was washed with water. The washed ether solution was dried, filtered and the ether removed by flash distillation. Distillation of the residue gave 45.1 g of O,O-diethyl propylphosphonate, b.p. 88°–91°/10 mm.

b. Preparation of O-ethyl hydrogen propylphosphonate:

A mixture of 37.1 g of O,O-diethyl propylphosphonate and 150 ml of 10 percent aqueous sodium hydroxide was heated at 100° for two hours. The solution was cooled in an ice bath, acidified to ca pH 4 and the acidic solution was extracted with chloroform. The chloroform extracts were dried over anhydrous sodium sulfate. The solvent was removed by flash distillation and the residue was distilled to give 10.3 g of O-ethyl hydrogen propylphosphonate, b.p. 106°–108°/0.45 mm structure confirmed by infrared spectroscopy.

Analysis: Calc'd for $C_5H_{13}O_3P$: C 39.48; H 8.64; P 20.32;
Found: C 38.54; H 8.73; P 19.96.

EXAMPLE 2

Preparation of Propylphosphonic Dichloride

To 106.2 g of O,O-diethyl propylphosphonate was added 245.5 g of phosphorus pentachloride, the addition being made in small portions so as to control the exothermic reaction. When addition was complete, the mixture was held at 130°–160° for 80 minutes while volatile by-products were distilled from the reaction mixture. The crude reaction products from three such preparations were combined. Sulfur dioxide gas was passed through the crude product for 15 minutes at room temperature, and the mixture was then heated to 150° and held there for 15 minutes. Distillation gave 201.2 g of propylphosphonic dichloride, b.p. 63°–71°/8–9 mm, structure confirmed by infrared spectroscopy.

EXAMPLE 3

Preparation of O-Propyl Hydrogen Propylphosphonate

To a solution of 20 g of propylphosphonic dichloride in 125 ml of diethyl ether was added slowly a solution of 7.5 g of n-propanol and 9.7 g of pyridine in 125 ml of diethyl ether. The rate of addition was such that the temperature remained in the range of 20°–25°. When addition was complete, the mixture was heated under reflux for 0.5 hour, then allowed to stand at room temperature overnight. The separated pryidine hydrochloride was removed by filtration and the filtrate concentrated by evaporation of the diethyl ether under reduced pressure. To the residue was added a solution of 20 g of sodium hydroxide in 200 ml of water. This mixture was maintained at 80° until it became homogeneous, and then maintained at 80° for one hour. The homogeneous mixture was then cooled to 5° and acidified with concentrated hydrochloric acid to pH 1. The acidic solution was extracted five times with 200-ml portions of diethyl ether. The ether extracts were combined, dried over sodium sulfate and concentrated under reduced pressure. The residue was distilled under reduced pressure to give 4.7 g of O-propyl hydrogen propylphosphonate, b.p. 118.5°–120°/0.069 mm Hg; $n_D^{25}$ 1.4313, structure confirmed by infrared spectroscopy.

EXAMPLE 4

Preparation of O-Propyl Hydrogen Ethylphosphonate

Ethylphosphonic dichloride (29.5 g), prepared from O,O-diethyl ethylphosphonate according to the method of Example 2, was reacted with 24.0 g of 1-propanol in the presence of 44 g of triethylamine, using the method exemplified in Example 3, with benzene as a solvent, to give 18.0 g of O,O-dipropyl ethylphosphonate, b.p. 110°–117°/15 mm; $n_D^{25}$ 1.4205, structure confirmed by infrared spectroscopy.

Hydrolysis of 15.1 g of this diester to the monoester was accomplished by heating the diester with 6.2 g of sodium hydroxide in 62 ml of water under reflux for 24 hours, according to the method exemplified in Example 2. The reaction gave 4.7 g of O-propyl hydrogen ethylphosphonate, b.p. 105°/0.1 mm, $n_D^{25}$ 1.4307, structure confirmed by infrared spectroscopy.

Analysis: Calc'd for $C_5H_{13}O_3P$: C 39.48; H 8.61; P 20.36;
Found: C 39.25; H 8.81; P 19.64.

EXAMPLE 5

Preparation of Propylphosphonic Oxide

To 36.0 g of propylphosphonic dichloride heated to 35°–40° was added 10.3 g of formic acid at such a rate as to maintain the temperature at 35°–40°. The temperature was maintained at 35°–40° for 30 minutes after addition was completed. The pressure of the system was then reduced to ca 20 mm and the temperature slowly increased during 1 hour to 130°–140°, and these conditions were maintained for 90 minutes. The reaction residue was essentially pure propylphosphonic oxide.

EXAMPLE 6

Preparation of O-Phenyl Hydrogen Propylphosphonate

A mixture of 8.9 g of propylphosphonic oxide and 7.9 g of phenol was slowly heated to 130°, maintained at 130° for 4 hours and then at 160° for 9 hours. During the last four hours at 160°, reduced pressure (ca 20 mm) was applied to the system to remove volatile material. The nonvolatile liquid residue, 11.3 g, $n_D^{27}$ 1.4980, was essentially pure O-phenyl hydrogen propylphosphonate, structure confirmed by infrared spectroscopy.

Analysis: Calc'd for $C_9H_{13}O_3P$: C 54.00; H 6.55; P 15.47;
Found: C 54.26; H 6.44; P 14.60.

EXAMPLE 7

Preparation of O-Ethyl Hydrogen Allylphosphonate

A mixture of 25.0 g of O,O-diethyl allylphosphonate, prepared according to the method of Gillis et al. [J. Am. Chem. Soc. 80, 3000(1958)], and 100 ml of 4N sulfuric acid was heated under reflux for 24 hours. The solution was extracted with five 100-ml volumes of chloroform. The chloroform extracts were dried over sodium sulfate and then stripped of volatile material at 50°/0.05 mm. The nonvolatile residue was mixed with 100 ml of cold 10 percent aqueous sodium hydroxide, chilled, and washed with five 50-ml volumes of chloroform. The aqueous solution was acidified to pH 1 with concentrated hydrochloric acid and extracted with five 50-ml volumes of chloroform. The extracts were combined, dried over sodium sulfate, and stripped of solvent. Distillation at 101° and $1 \times 10^{-5}$ mm Hg gave 7.3 g of O-ethyl hydrogen allylphosphonate, structure confirmed by infrared spectroscopy and nuclear magnetic resonance.

Analysis: Calc'd for $C_5H_{11}O_3P$: C 40.00; H 7.38; P 20.63;
Found: C 39.38; H 7.35; P 20.39.

EXAMPLE 8

Preparation of O-Ethyl Hydrogen trans-1-Propenylphosphonate

A mixture of 27.7 g of O,O-diethyl allylphosphonate and 12.0 g of sodium hydroxide in 120 ml of water was heated under reflux for 24 hours according to the procedure exemplified in Example 2 to give 2.2 g of a product, $n_D^{25}$ 1.4511. While hydrolysis under acid conditions as described in Example 7 did not rearrange the allyl group, hydrolysis under basic conditions gave substantial rearrangement of allyl to 1-propenyl. Thus proton magnetic resonance studies showed this product to be made up of 4 parts O-ethyl hydrogen trans-1-propenylphosphonate and 1 part O-ethyl hydrogen allylphosphonate.

Analysis: Calc'd for $C_5H_{11}O_3P$: C 40.00; H 7.38; P 20.63;
Found: C 39.88; H 7.65; P 20.45.

EXAMPLE 9

Preparation of 1-Hydroxypropylphosphonic Acid

To 58.1 g of cold (0.5°) vigorously stirred propionaldehyde, 41.2 g of phosphorus trichloride was slowly added at such a rate that the temperature remained at 0°–5°. After standing at room temperature for 18 hours, the mixture was poured slowly, with vigorous stirring, into 1.5 liters of cold water. The aqueous mixture was filtered and then taken to dryness under reduced pressure to give a brown solid. The solid was treated with 200 ml of water and again taken to dryness under reduced pressure. The solid was next treated with 400 ml of boiling benzene and filtered, then treated with 500 ml of boiling ether and filtered to give, after drying, 29.7 g of 1-hydroxypropylphosphonic acid, m.p. 155°–157°.

EXAMPLE 10

Preparation of 1-Acetoxypropylphosphonic Acid

A mixture of 20.7 g of 1-hydroxypropylphosphonic acid and 32.4 g of acetyl chloride was warmed to initiate reaction, then allowed to stand until the solution was clear. As soon as the solution was clear, excess acetyl chloride was removed by slow distillation at atmospheric pressure. Remaining volatile material was removed by keeping the reaction mixture at room temperature and reducing the pressure to 0.06 mm Hg for 3.5 hours, then to 0.02 mm Hg for 4 hours. The nonvolatile reaction product was dissolved in 50 ml of hot benzene and treated with activated charcoal. Removal of benzene under reduced pressure gave 17.6 g of extremely viscous 1-acetoxypropylphosphonic acid, structure confirmed by infrared spectroscopy.

Analysis: Calc'd for $C_5H_{11}O_5P$: C 32.98; H 6.09; P 17.01;
Found: C 33.79; H 5.68; P 17.96.

EXAMPLE 11

Preparation of O-Ethyl Propylphosphonochloridate

A solution of 14.3 g of ethanol and 31.4 g of triethylamine in 250 ml of dry ether was added to a chilled (ice-bath), stirred, solution of 50.0 g of propylphosphonic dichloride in 550 ml of dry ether at such a rate that the temperature remained at 20°–25°. The mixture was stirred for 18 hours at room temperature, then filtered. After removal of low-boiling materials, under reduced pressure, the filtrate was distilled to give 32.0 g of O-ethyl propylphosphonochloridate, b.p. 43°–46°/0.35 mm, structure confirmed by infrared spectroscopy.

EXAMPLE 12

Preparation of O-Ethyl Hydrogen Propylphosphonothioate

A solution of sodium ethoxide was prepared by dissolving 5.3 g of metallic sodium in 300 ml of dry ethanol. Hydrogen sulfide gas was slowly bubbled into this solution until it was saturated, and then 20.0 g of O-ethyl propylphosphonochloridate was slowly added at such a rate that the temperature was kept below 30°. The reaction mixture was stirred for 18 hours, then evaporated nearly to dryness under reduced pressure, treated with 100 ml of water and again concentrated under reduced pressure. The residue was dissolved in 250 ml of water. The aqueous solution was washed with ether, cooled to 5°, acidified to pH 1 with concentrated hydrochloric acid, and extracted with five 200-ml volumes of ether. The ether extracts were combined, dried over sodium sulfate, stripped of low-boiling materials, and distilled to give 9.4 g of O-ethyl hydrogen propylphosphonothioate, b.p. 77°/0.15 mm Hg, structure confirmed by infrared spectroscopy.

Analysis: Calc'd for $C_5H_{13}O_2PS$: C 35.70; H 7.79; P 18.42; S 19.06;
Found: C 35.96; H 8.12; P 17.50; S 19.84.

EXAMPLE 13

Preparation of Propylphosphonothioic Dichloride

Under an atmosphere of dry carbon dioxide, a mixture of 160.98 g of propylphosphonic dichloride and 44.5 g of phosphorus pentasulfide was heated at 130°–160° with stirring for 5 hours. The material boiling at 55°–90° at aspirator pressure was distilled from the reaction mixture and washed with two 50-ml portions of ice water. After drying over sodium sulfate, this product was distilled to give 69.8 g of propylphosphonothioic dichloride, b.p. 72°–80°/12 mm, structure confirmed by infrared spectroscopy.

EXAMPLE 14

Preparation of O-Ethyl Propylphosphonochloridothionate

To a hot (35°) solution of 69.8 g of propylphosphonothioic dichloride in 200 ml of dry benzene was added a mixture of 18.2 g of ethanol and 39.9 g of triethylamine, at such a rate as to maintain the temperature at 35°–40°. The reaction mixture was stirred at 35°–40° for 16 hours and then filtered. The precipitate was washed with 100 ml of dry benzene and the washings added to the filtrate. After removal of the solvent, the filtrate was distilled to give 55.5 g of O-ethyl propylphosphonochloridothionate, b.p. 32°–34°/0.14 mm Hg, $n_D^{25}$ 1.4888, structure confirmed by infrared spectroscopy.

Analysis: Calc'd for $C_5H_{12}OClPS$: C 32.18; H 6.48; Cl 19.00; P 16.60; S 17.18;
Found: C 32.30; H 6.60; Cl 18.90; P 16.40; S 17.17.

EXAMPLE 15

Preparation of O-Ethyl Hydrogen Propylphosphonodithioate

A solution of sodium ethylmercaptide prepared from 2.6 g of sodium metal was reacted with 10.4 g of O-ethyl propylphosphonochloridothioate according to the method of Example 12 to give on distillation 0.6 g of O-ethyl hydrogen propylphosphonodithioate, b.p. 46.5°–48°/0.1 mm Hg, structure confirmed by infrared spectroscopy.

Analysis: Calc'd for $C_5H_{13}OPS_2$: C 32.59; H 7.11; P 16.81; S 34.80;
Found: C 32.69; H 6.92; P 16.74; S 34.70.

EXAMPLE 16

Preparation of S-Propyl Hydrogen Propylphosphonothiolate

A solution of 23.6 g of propyl mercaptan and 31.4 g of triethylamine in 250 ml of dry ether was added to a solution of 25.0 g of propylphosphonic dichloride in 250 ml of dry ether at such a rate that the temperature was maintainable at 20°–25° by use of an ice bath. The mixture was stirred for 16 hours, then filtered. The filtrate was stripped of solvent and distilled under reduced pressure to give 21.2 g of S,S-dipropyl propylphosphonodithiolate, b.p. 89°–91°/0.1 mm; $n_D^{25}$ 1.5176.

Fifteen grams of S,S-dipropyl propylphosphonodithiolate was hydrolyzed according to the general method of Example 2 using 5.0 g of sodium hydroxide in 45 ml of water to give 7.8 g of S-propyl hydrogen propylphosphonothiolate, structure confirmed by infrared spectroscopy. Solvent was removed under reduced pressure, but there was no attempt at distillation owing to the possibility of disproportionation.

Analysis: Calc'd for $C_6H_{15}O_2PS$: C 39.55; H 8.30; P 17.00; S 17.60;
Found: C 39.21; H 8.23; P 17.73; S 16.33.

EXAMPLE 17

Preparation of Sodium O-Ethyl Propylphosphonate

Five grams of O-ethyl hydrogen propylphosphonate in 25 ml of absolute ethanol was neutralized by dropwise addition of a solution of 1.3 g of sodium hydroxide in 50 ml of ethanol. The mixture was heated under reflux for 2 hours. Removal of the solvent under reduced pressure left a thick, resinous material. This product was dissolved in 100 ml of chloroform, the solution was filtered, and the chloroform was removed under reduced pressure to give a clear yellow resinous material, which on trituration with ethyl ether gave 4.4 g of a fine, white solid, sodium O-ethyl propylphosphonate, m.p. > 250°, structure confirmed by infrared spectroscopy.

EXAMPLE 18

Preparation of Zinc Bis (O-ethyl propylphosphonate)

A mixture of 6.1 g of O-ethyl hydrogen propylphosphonate and 2.5 g of zinc carbonate in 80 ml of absolute ethanol was stirred at room temperature for 70 hours. The mixture was filtered and the filtrate concentrated under reduced pressure to give 6.4 g of white semi-solid. The semi-solid, washed twice with 10-ml volumes of water and dried at 0.15 mm for one hour, yielded 3.9 g of zinc bis (O-ethyl) propylphosphonate), m.p. 60°–75°, structure confirmed by infrared spectroscopy and nuclear magnetic resonance.

Analysis: Calc'd for $C_{10}H_{24}O_6P_2Zn$: C 32.67; H 6.58; P 16.84;
Found: C 32.97; H. 6.63; P 16.61.

EXAMPLE 19

Preparation of Butylammonium O-Ethyl Propylphosphonate

Five grams of O-ethyl hydrogen propylphosphonate was placed in a 25-ml graduated cylinder, and to it was added first 15 ml of water and then 2.41 g of butylamine. When the exothermic reaction subsided, the solution was cooled to 20° and adjusted to a volume of 25 ml by addition of water. The resultant solution, containing 1.32 moles/liter of the salt, was used directly in testing.

EXAMPLE 20

Preparation of Propylphosphonic Acid

A mixture of 58.4 g of O,O-diethyl propylphosphonate and 310 ml of concentrated hydrochloric acid was heated under reflux for 8 hours. After removal of approximately one half the volume of acid by distillation, the remaining solution was carefully evaporated to dryness. The crude solid was recrystallized from ether-hexane to give 17 g of solid melting at 52°–60°. Subsequent recrystallization from hexane gave 9.6 g of propylphosphonic acid, m.p. 71°–73°.

Following the general procedures exemplified above, many phosphonic acid derivatives of the class described are readily prepared. Examples of such plant regulators include the following:

Example 21.  O-Butyl hydrogen propylphosphonate

Example 22.  O-Pentyl hydrogen propylphosphonate

Example 23.  O-Methallyl hydrogen propylphosphonate

Example 24.  O-(2-Ethylhexyl) hydrogen propylphosphonate

Example 25.  O-Methyl hydrogen propylphosphonate

Example 26.  O-Isobutyl hydrogen propylphosphonate

Example 27.  O-Allyl hydrogen propylphosphonate

Example 28.  O-Hexyl hydrogen propylphosphonate

Example 29.  O-Isopropyl hydrogen propylphosphonate

Example 30.  O-Dodecyl hydrogen propylphosphonate

Example 31.  Calcium bis(O-ethyl propylphosphonate)

Example 32.  Dodecylammonium O-ethyl propylphosphonate

Example 33.  Morpholinium O-ethyl propylphosphonate

Example 34.  Triethylammonium O-ethyl propylphosphonate

Example 35.  N-Methylanilinium O-ethyl propylphosphonate

Example 36.  Disodium propylphosphonate

Example 37.  Ethylphosphonic acid

EXAMPLE 38.

Growth Control of Annual Plants with O-Ethyl Hydrogen Propylphosphonate

In flats containing sterile loam soil were planted, at a depth of 1 inch, seeds of corn (*Zea mays*) and lima beans (*Phaseolus lunatus*); at a depth of one fourth to one half inch were planted seeds of lettuce (*Lactuca sativa*), mustard (*Brassica juncea*) and crabgrass (*Digitaria sanguinalis*). These plant species are representative of a wide variety of annual plants and were selected on this basis. The flats were watered and the plants allowed to grow under good growing conditions for two weeks. Maintaining untreated plants for comparison, the stand of plants was sprayed with a solution of O-ethyl hydrogen propylphosphonate in a volume of acetone-water equivalent to eighty gallons per acre, at a rate equivalent to eight pounds of the phosphonate per acre. Two weeks after treatment, the condition of the treated plants was compared with that of untreated plants which had been maintained under the same growing conditions. Results are shown in Table 1.

Table 1

| Response of Annual Plants | |
|---|---|
| Plant | Condition of Plant |
| Lima beans | Primary leaves darker green and turgid; apical growth destroyed. |
| Corn | Plant growth arrested, followed by slow dieback from the apex. |
| Lettuce | Slight necrosis of leaf margins. |
| Mustard | New growth inhibited; slight marginal necrosis produced in leaves present at time of treatment. |
| Crabgrass | Leaves initially stunted and curled, but slowly regrew to nearly normal size. |

EXAMPLE 39

Growth Control of Annual Plants with O-Propyl Hydrogen Propylphosphonate

Following the procedure described in Example 38, O-propyl hydrogen propylphosphonate was applied to lima beans, corn, lettuce, mustard, and crabgrass. The response of the plants to this treatment was very similar to their response to O-ethyl hydrogen propylphosphonate: the growth of lima beans, corn and crabgrass was arrested, and the general vigor of lettuce and mustard was markedly reduced.

EXAMPLE 40

Quantitative Determination of the Response of Annual Plants to Propylphosphonic Acid and Derivatives Aqueous acetone (1:1) sprays were applied to each of five individually-plotted, 2-week-old, healthy plants at a rate equivalent to 4 pounds of phosphonate per acre. The treated plants, along with a set of untreated plants, were maintained in the greenhouse under good growing conditions. Observations were made 16 days after treatment. The values reported as height are each an average of five replicates measured as follows:

| Lima beans | from cotyledonary node to apex of plant |
| Pinto beans | from cotyledonary node to apex of plant |
| Soybeans | from cotyledonary node to apex of plant |
| Corn | from soil to tip of longest leaf |
| Crabgrass | median stand height |

All plants treated with propylphosphonic acid and O-ethyl hydrogen propylphosphonate, plant regulators of the invention, showed moderate injury, but were surviving and were sufficiently vigorous to continue to survive. Those plants treated with the diester of the prior art showed neither retardation nor injury and were essentially equivalent in appearance to the untreated plants. The results are recorded in Table 2.

TABLE 2.—RESPONSE OF ANNUAL PLANTS TO PROPYL-PHOSPHONIC ACID DERIVATIVES

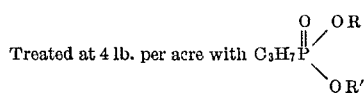

Treated at 4 lb. per acre with $C_3H_7\overset{\overset{O}{\|}}{P}\overset{OR}{\diagdown}_{OR'}$

| | Height in inches 16 days after treatment | | | | |
|---|---|---|---|---|---|
| | Lima beans | Pinto beans | Soy-beans | Corn | Crab-grass |
| Untreated | 11 | 14 | 9 | 76 | 17 |
| Acid (R & R'=H) | ª5 | ª8 | 6 | ª34 | 3 |
| Monoester (R=H, R'=C$_2$H$_5$) | 7 | ª9 | 6 | ª39 | 12 |
| Diester (R & R'=C$_2$H$_5$) | 13 | 13 | 8 | 74 | 18 |

ªTop growth completely inhibited, but plants surviving.

From these data it is apparent that the free acid and the monoester, plant regulators of this invention, substantially retarded plant growth. It is similarly apparent that the corresponding diester had essentially no effect on the test plants.

EXAMPLE 41

Response of Annual Plants to Treatment with Phosphonic Acid Derivatives of the Invention By the test method of Example 38 flats containing growing plants of lima beans, corn, lettuce, mustard and crabgrass were treated, at a rate equivalent to eight pounds per acre, with each of a variety of the phosphonic acid derivative plant regulators of the invention. Results are shown in Table 3.

From these data it is apparent that a wide variety of acidic derivatives of phosphonic acids within the scope of the invention show plant regulator activity. Different compounds show different degrees of selectivity. At the rate of 8 lbs per acre several of the compounds, in addition to showing plant regulator activity, selectively killed certain species, particularly corn and crabgrass. For each of the compounds listed there was at least one of the test plant species, and usually more than one, which was retarded, but not killed. In many cases where plants were killed it was possible to observe that they were also retarded. At lower rates of application such compounds continue to show plant regulator activity, but do not kill. Thus the compounds of Examples 22, 23, and 25 each gave 100 percent kill of corn at 8 pounds per acre. At one pound per acre these compounds all retarded corn without killing any plants.

That the plant regulator activity of this invention is not shown by a related diester was demonstrated quantitatively in Example 40. This observation has been confirmed by qualitative observations on a number of diesters by the test method of Example 38. The lower esters neither retard nor damage. As the molecular weight of the alcohol group increases, phytotoxicity also increases. In no case was retardation observed. Results are shown in Table 4.

Table 3

Response of Annual Plants to Phosphonic Acid Derivatives

| Compound of Example | Treated at 8 lb/acre Condition Two Weeks After Treatment | | | | |
|---|---|---|---|---|---|
| | Lima Beans | Corn | Lettuce | Mustard | Crabgrass |
| 3 | R | R-100 | R | R | R-75 |
| 4 | R | R | N | N | R |
| 5 | R-100 | R | R | R | R-100 |
| 6 | R | R-100 | N | N | R-90 |
| 7 | R | R-20 | N | N | N |
| 8 | R | R-75 | N | R | R-75 |
| 9 | R | N | N | R | N |
| 10 | R | R | N | N | R |
| 11 | R | R-100 | N | N | R-60 |
| 12 | R | R-100 | N | R | R-80 |
| 13 | R | R-100 | N | N | R |
| 14 | R-100 | R | N | N | R-10 |
| 15 | R | R-75 | R-30 | N | R |
| 16 | R | R-100 | R | N | R-75 |
| 20 | R | R | 60 | R-20 | R |
| 21 | R | R-100 | R-10 | R | R-60 |
| 22 | R | R-100 | R-20 | R | R-80 |
| 23 | R | R-100 | R | R | R-80 |
| 24 | R-25 | R | R | R | R |
| 25 | R | R-100 | N | N | R-95 |
| 26 | R | R | N | N | N |
| 27 | R | R | 95 | 10 | 20 |
| 28 | R | R-100 | R | R-95 | R |
| 29 | R | R-40 | N | R | N |
| 30 | R | R | N | N | R |
| 37 | R | R | N | N | 40 |
| Summary: | | | | | |
| No. of compounds | | | | | |
| Retarding | 26 | 25 | 9 | 12 | 20 |
| Retarding and Killing | 3 | 15 | 3 | 2 | 12 |
| Killing only | — | — | 2 | 1 | 2 |

R — growth retarded
N — not retarded, no substantial injury
Number only — percent killed, no retardation
R-number — percent killed, plants also retarded.

Table 4

Response of Plants to Prior Art Diesters C₃H₇P(O) (OR)₂
8 lb/acre

| R | Percent Kill | | | | |
|---|---|---|---|---|---|
| | Lima Beans | Corn | Lettuce | Mustard | Crabgrass |
| Methyl | 0 | 0 | 0 | 0 | 0 |
| Ethyl | 0 | 0 | 0 | 0 | 0 |
| n-Propyl | 40 | 0 | 0 | 0 | 0 |
| i-Propyl | 0 | 0 | 0 | 0 | 0 |
| Butyl | 100 | 80 | 20 | 90 | 60 |
| i-Butyl | 100 | 0 | 10 | 0 | 0 |
| n-Pentyl | 60 | 100 | 40 | 95 | 95 |
| n-Hexyl | 100 | 80 | 30 | 90 | 95 |

EXAMPLE 42

Response of Annual Plants to Treatment with salts of O-Ethyl Hydrogen Propylphosphonate The test method of Example 38 was used in treating flats containing growing plants of lima beans, corn, lettuce, mustard, and crabgrass with salts of O-ethyl hydrogen propylphosphonate. Each salt was applied as a water solution sprayed at a rate equivalent to 4 pounds per acre. Each salt retarded three of the five plant species used. Results are shown in Table 5.

Table 5

Response of Annual Plants to Phosphonate Salts
Treated at 4 lb/acre

| Compound of Example | Lima Beans | Corn | Lettuce | Mustard | Crabgrass |
|---|---|---|---|---|---|
| 17 | R | R | N | N | R |
| 18 | R | R | N | N | R |
| 19 | R | R | N | N | R |
| 31 | R | R | N | N | R |
| 32 | R | R | N | N | R |
| 33 | R | R | N | N | R |
| 34 | R | R | N | N | R |
| 35 | R | R | N | N | R |
| 36 | R | R | N | N | R |

R = retarded
N = no retardation, no substantial injury

EXAMPLE 43

Control of Woody Plants with O-Ethyl Hydrogen Propylphosphonate

A formulation was prepared by mixing 59.26 parts of O-ethyl hydrogen propylphosphonate, 37.12 parts xylene, 2.17 parts calcium dodecylbenzenesulfonate and 1.45 parts of a nonylphenol ethylene oxide condensate. A spray mixture was prepared by mixing 1.49 g of this formulation with sufficient water to make a total volume of 80 ml; this is equivalent in concentration to six pounds of the formulation per eighty gallons of spray. Test plants were selected such that all individual plants were of uniform size and vigor. Silver maple (*Acer saccharinum*) plants were 24–30 inches in height with a canopy spread of about 6 inches. Mock orange (*Philadelphus virginalis*) plants were 12–15 inches in height with a canopy spread of about 6–8 inches; mock orange (*Philadelphus coronarius*) plants were 8 inches in height with a canopy spread of about 6 inches. Regal privet (*Ligustrum regelianum*) plants were 14 inches in height with a canopy spread of 15 inches. The silver maple and mock orange (*P. virginalis*) plants were removed from dormancy three weeks prior to treatment; the mock orange (*P. coronarius*) were removed from dormancy one week prior to treatment. Regal privet plants were trimmed to size just prior to treatment. Two plants of each test species were sprayed to run-off. The treated plants were maintained under normal growing conditions for fifteen weeks, at which time the growth-arrestant response was evaluated by comparison with untreated plants.

Table 6

Response of Woody Plants

| Plant | Condition of Plant |
|---|---|
| Silver maple | Shoot extension markedly inhibited; slight chlorosis of some leaves. |
| Mock orange (*P. virginalis*) | New shoots and leaves reduced in size; axillary shoots proliferated; some leaves chlorotic. |
| Mock orange (*P. coronarius*) | Shoot extension inhibited; slight chlorosis of some leaves. |
| Regal privet | No shoot expansion; new leaves minute and chlorotic; original leaves defoliated |

EXAMPLE 44

Control of Woody Plants with O-Propyl Hydrogen Propylphosphonate

The growth-arrestant properties of O-propyl hydrogen propylphosphonate were determined, using the method described in Example 43. The response of woody plants to this treatment was very similar to their response to O-ethyl hydrogen propylphosphonate: the growth of silver maple, both species of mock orange, and regal privet, was markedly inhibited.

EXAMPLE 45

Growth Response of Woody Plants to O-Ethyl Hydrogen Propylphosphonate

A formulation containing 5 pounds per gallon of O-ethyl hydrogen propylphosphonate was prepared by mixing 60 parts of the phosphonate monoester with four parts of a sorbitan monooleate-ethylene oxide condensate surfactant and 36 parts of xylene. This emulsifiable concentrate was diluted with water so as to provide aqueous solutions containing the equivalent of 4.0 and 8.0 pounds of O-ethyl hydrogen propylphosphonate per 100 gallons. These plant regulator solutions were applied as a foliar spray and as a drench treatment to individual, established, 3–4 year old plants, at rates equivalent to 8.0 and 4.0 pounds of plant regulator per acre. Treatment was in June, and observations were made in September and May, 99 days and 11 months after treatment. Results are shown in Table 7.

Table 7

Growth Response of Woody Plants to O-Ethyl Hydrogen Propylphosphonate

| Species | Application Rate (lb/acre) | Observations at Stated Period After Treatment | |
|---|---|---|---|
| | | 99 Days | Eleven Months |
| Pyramid arborvitae (*Thuja occidentalis pyramidalis*) | foliar (8) | retarded, off-color | no new growth, off-color |
| | foliar (4) | retarded, off-color | no new growth, off-color |
| | drench (8) | retarded, off-color | no new growth, off-color |
| | control | normal | normal |
| Andorra juniper (*Juniperus hibernica plumosa*) | foliar (8) | retarded | retarded, buds delayed |
| | foliar (4) | retarded | retarded, buds delayed |
| | drench (8) | retarded | retarded, buds delayed |
| | control | normal | normal |
| Globe arborvitae (*Thuja occidentalis Woodward*) | foliar (8) | retarded, sl. burn | no new growth |
| | control | normal | normal |
| Hetz blue juniper (*Juniperus chinensis hetzi*) | foliar (8) | retarded | new growth delayed |
| | foliar (4) | retarded | new growth delayed |
| | drench (8) | retarded | new growth delayed |
| | control | normal | normal |
| Spreading yew (*Taxus cuspidata*) | foliar (8) | retarded | retarded, new growth off-color |
| | drench (8) | retarded | retarded, new growth off-color |
| | control | normal | normal |
| Bush cinquefoil (*Potentilla fruitcosa*) | foliar (8) | retarded, s. burn | retarded, tip kill, buds delayed |
| | foliar (4) | retarded, s. burn | retarded, tip kill, buds delayed |
| | drench (8) | retarded, s. burn | retarded, tip kill, buds delayed |
| | control | normal | normal with flowers |
| Chinese privet (*Ligustrum ibota*) | foliar (8) | retarded, s. burn | severely retarded, partial kill |
| | foliar (4) | retarded, s. burn | retarded, growth good |
| | drench (8) | retarded, s. burn | retarded, growth good |
| | control | normal | normal |
| Viburnum (*Virburnum sp.*) | foliar (8) | retarded, s. burn | severely retarded, partial kill |
| | foliar (4) | retarded, s. burn | normal, more flowers than control |
| | drench (8) | retarded | normal |
| | control | normal | normal |
| Dogwood (*Cornus sp.*) | foliar (8) | retarded | retarded, new growth normal |
| | foliar (4) | retarded | retarded, new growth normal |
| | drench (8) | normal | normal |
| | control | normal | normal |
| Jetbead (*Rhodotypus scandens*) | foliar (8) | retarded, s. burn | retarded, new growth normal |
| | foliar (4) | retarded, s. burn | retarded, partial kill |
| | drench (8) | retarded, s. burn | dead |
| | control | normal | normal |
| Lilac (*Syringa sp.*) | foliar (8) | retarded, s. burn | dead |
| | foliar (4) | retarded, sl. burn | retarded, more flowers than control |
| | drench (8) | retarded | retarded, more flowers than control |
| | control | normal | normal |
| Mountain Currant (*Ribes alpinum*) | foliar (8) | retarded | retarded, new growth normal |
| | drench (8) | retarded | normal |
| | control | normal | normal |
| Spirea [Dwarf pink] (*Spiraea froebeli*) | foliar (8) | retarded, sl. burn | normal |
| | drench (8) | retarded, sl. burn | severely retarded |
| | control | normal | normal |
| Coralberry (*Symphoricarpos chenault*) | foliar (8) | retarded, s. burn | dead |
| | drench (8) | retarded, sl. burn | dead |
| | control | normal | normal |
| Arrowwood (*Viburnum dentatum*) | foliar (8) | retarded, s. burn | retarded, new growth normal |
| | drench (8) | retarded, sl. burn | retarded, more flowers than control |
| | control | normal | normal |
| Winged Euonymus (Euonymus alatus) | foliar (8) | retarded, s. burn | no new growth |
| | foliar (4) | retarded, s. burn | retarded, new growth normal |
| | drench (8) | retarded, s. burn | new growth retarded |
| | control | normal | normal |
| Deutzia (*Deutzia scabra*) | foliar (8) | retarded, sl. burn | retarded, new growth normal |
| | drench (8) | retarded, sl. burn | retarded, new growth normal |
| | untreated | normal | normal | s. burn = severe burn
sl. burn = slight burn

From these data it is apparent that the plant regulator retarded a wide variety of plants and that the effect persisted into the growing year following the year of treatment. An additional plant regulator response noted with several flowering species was an increase in the number of flowers on treated plants compared with the number on the untreated controls.

EXAMPLE 46

Retardation of Growth of Trees by Application of Propylphosphonic Acid Monoesters Formulations of O-ethyl hydrogen propylphosphonate and O-propyl hydrogen propylphosphonate containing the equivalent of four pounds and two pounds respectively per gallon of propylphosphonic acid were prepared by mixing the following.

|  | O-ethyl | O-propyl |
|---|---|---|
| Propylphosphonate monoester | 59.26% | 65.97% |
| Calcium dodecylbenzenesulfonate | .36 | .93 |
| Ethylene oxide condensates of nonylphenol and propylene oxide | 3.26 | 2.77 |
| Xylene | 37.12 | 30.33 |

Sprays were prepared by diluting these emulsifiable formulations with water so as to give mixtures containing the equivalent of 1.5, 3 and 5 pounds of propylphosphonic monoester per 100 gallons. Selected healthy trees were sprayed to run-off. At the time of application, the trees were characterized as follows:

| | |
|---|---|
| Ash (*Fraxinus americana*) | 5–8 feet tall; trunk diameter of 1 – 1½ inches at ground line; new growth had 4–6 leaves with shoot expansion between 2–4 inches. |
| Hophornbeam (*Ostrya virginiana*) | 5–8 feet tall; trunk diameter of ¾–1 inch at ground line; new growth had 4–5 leaves with little length extension. |
| Poplar (*Populus tremuloides* Michx.) | 4–9 feet tall; trunk diameter of ¾ to 1½ inches at ground line, new growth had 5–6 leaves with shoot expansion between 1–2 inches. |

On each tree certain limbs were tagged and all growth measurements throughout the test were made on these identified limbs. Measurements were made of the growth during the growing season prior to treatment, the season of treatment, and of the two subsequent seasons in the instance of ash and hophornbeam and of the first subsequent season in the instance of poplar. Results are summarized in Table 8.

substantial reduction in the growth of trees, both in the year of application and in the following growth year.

EXAMPLE 47

Influence of O-Ethyl Hydrogen Propylphosphonate on Fruit Maturation in Tomatoes

Tomato plants (variety Bonny Best) in which the first fruiting cluster had matured to the point of definable fruit were sprayed with O-ethyl hydrogen propylphosphonate at rates equivalent to 6.0, 3.0 and 1.5 pounds per acre in volumes equivalent to eighty gallons per acre. Three plants were used for each treatment rate, and three plants were kept untreated for comparison.

Six weeks after application the untreated plants had produced extensive growth, both apical and sucker. The fruit of the first cluster had matured to ripe fruit, the second cluster had developed to large green fruit, and several additional clusters at various stages of early development were also present.

Plants treated with 1.5 pounds per acre of O-ethyl hydrogen propylphosphonate had matured the fruit of the first cluster to normal fruit. There had been no further fruit set, no proliferation of sucker growth, and only a slight increase in apical growth.

Plants treated with 3.0 pounds per acre also had matured the fruit of the first cluster to normal fruit. There had been no further growth of foliage. The plants were beginning to show necrosis.

Plants treated at the six pound per acre rate also matured the fruit of the first cluster to normal fruit without further foliar development. The plants were developing necrotic tissue.

Thus treatment with O-ethyl hydrogen propylphosphonate markedly inhibited further foliar development while permitting the normal ripening of already formed fruit. This effect gives a distinct advantage where tomatoes are grown in heavily-planted fields designed for machine harvest with the field to be picked but once.

EXAMPLE 48

Reduction of Premature Dropping of Apples by Treatment with O-Ethyl Hydrogen Propylphosphonate The emulsifiable concentrate of Example 45 was diluted with water to give a solution containing the equivalent of 2.0 pounds of phosphonate per 100 gallons, and the solution was applied to apple trees bearing ripe Table 8

Plant Regulator Compounds Retard Growth of Trees

| Trees | Compound of | Application Rate (lb/100 gal) | Average Branch Growth in Inches | | | | |
|---|---|---|---|---|---|---|---|
| | | | Year Before Treatment | Year of Treatment | Year Following Treatment | Second Year After Treatment | Total After Treatment |
| Ash | Example 1 | 3 | 7.7 | 4.7 | 3.7 | 12.6 | 21.0 |
| Ash | None | — | 6.5 | 13.6 | 10.8 | 12.8 | 37.2 |
| (Percent Retardation) | | | | (66%) | (66%) | (2%) | (44%) |
| Hophornbeam | Example 3 | 5 | 9.5 | 2.2 | 4.4 | 7.9 | 14.6 |
| Hophornbeam | None | — | 11.1 | 5.5 | 7.3 | 8.0 | 20.7 |
| (Percent Retardation) | | | | (59%) | (39%) | (0.6%) | (30%) |
| Poplar | Example 1 | 1.5 | 31.4 | 4.0 | 11.5 | — | 15.5 |
| Poplar | None | — | 31.2 | 29.4 | 20.1 | — | 49.5 |
| (Percent Retardation) | | | | (87%) | (43%) | | (69%) |

Thus the plant regulators of the invention, applied after growth has started in a new growing season, cause a fruit by spraying to "run-off." Counts of apples fallen and remaining on the trees taken during the ensuing month showed a substantial reduction in premature drop for the treated trees. The applies which remained on the trees did not overripen and appeared in excellent condition at the time of picking. Thus chemical treatment affords the grower an extended period for harvesting by protecting against losses due to bruised and unsalable fruit caused by premature apple drop. The data are shown in Table 9.

the 25 ppm treatment is statistically significant (at the 95 percent confidence level); that with 5 ppm is not.

EXAMPLE 51

Ripening Effect of O-Ethyl Hydrogen Propylphosphonate on Tomatoes, Pre- and Post-harvesting The fruit of tomatoes (variety Valiant) treated in the field before harvest at 500 ppm or after harvest at 500

Table 9

Reduction of Apple Drop with O-Ethyl Hydrogen Propylphosphonate
treated at 2 lb/100 gal

| Type of Tree | | Apples per Tree* | Number of Apples Dropped in Period Shown Days after Treatment | | | | | | | Total Period | Percent Drop |
|---|---|---|---|---|---|---|---|---|---|---|---|
| | | | 7 | 14 | 17 | 21 | 24 | 28 | 31 | | |
| Jonathan | treated | 205 | 0 | 1 | 7 | 5 | 2 | 7 | 5 | 27 | 13.2 |
| | untreated | 285 | 0 | 1 | 57 | 36 | 21 | 17 | 8 | 140 | 49.1 |
| Yellow Delicious | treated | 470 | 0 | 0 | 8 | 6 | 7 | 3 | 1 | 25 | 5.3 |
| | untreated | 625 | 2 | 8 | 15 | 27 | 24 | 13 | 3 | 92 | 14.7 |

*Approximate number of apples on tree at time of chemical treatment.

EXAMPLE 49

Effect of O-Ethyl Hydrogen Propylphosphonate on Rooting of Chrysanthemum Cuttings: Increased Root Weight The basal one-half inch of freshly cut stems of chrysanthemum (variety Indianapolis White), 3 to 4 inches in length, was dipped for 15 seconds into a solution containing 25, 250, or 1000 ppm of O-ethyl hydrogen propylphosphonate and immediately inserted in the sand bed of a rooting bench. The cuttings were kept moist by an intermittent misting apparatus for about two weeks and then removed from the sand bed. The roots were washed free of sand, cut from the stem, dried, and weighed. Treatment at 25 ppm gave a substantial increase in the weight of the dried roots. Results are reported in Table 10.

Table 10

Rooting of Cuttings of Indianapolis White Chrysanthemum
Treated with O-Ethyl Hydrogen Propylphosphonate

| Treatment | Number of Roots* | Dry Weight of Roots* (mg) | Length of Longest Root* (cm) |
|---|---|---|---|
| Control | 14.5 | 111.5 | 4.53 |
| 25 ppm | 14.3 | 149.7 | 4.42 |
| 250 ppm | 12.5 | 105.0 | 3.05 |
| 1000 ppm | 10.3 | 126.7 | 4.50 |

* means values

EXAMPLE 50

Effect of O-Ethyl Hydrogen Propylphosphonate on Tomato Plants: Increase in Number of Flowers Application of O-ethyl hydrogen propylphosphonate to tomato plants (variety Fireball) at the first true leaf stage resulted in an increased production of flowers on the first three clusters. Such an increase in early flowers leads to early and uniform maturation of more fruit, thus giving a better yield of marketable fruit when the crop is subjected to once-through mechanical harvesting. The means of five replicates were 13.6 flowers for the untreated control, 16.4 flowers for treatment with the plant regulator at 5 ppm, and 17.8 flowers for treatment at 25 ppm. The increased number of flowers with ppm or 1,000 ppm showed an increase (statistically significant at the 95 percent confidence level) in ripeness compared to fruit from untreated tomato plants. With postharvest treatment at 250 ppm, ripening was not statistically different from the control. These results have been reported and discussed by A. A. Boe, HortScience, 6, No. 4, 399–400 (1971).

EXAMPLE 52

Effect of O-Ethyl Hydrogen Propylphosphonate on Fruit Yield of Cucumber Plants.

In the production of cucumbers for pickling it is highly desirable to increase the number of marketable cucumbers, and with a view to the possibility of once-through harvesting it is particularly desirable to have a concentration of fruit set so that a large number of marketable fruit are on the vine at the same time. One way to increase the number of fruit for once-through harvest is through the use of gynoecious varieties, but many of these varieties do not produce high yield. In the present experiment 30-foot plots of pickling cucumbers at the fifth leaf stage were sprayed with a solution containing 250 ppm of O-ethyl hydrogen propylphosphonate. Treated plots of NK805, a gynoecious variety, gave a desirable concentration of fruit set and yielded 406 marketable fruit (mean value), a statistically significant (95 percent confidence level) improvement over the 326 fruit obtained from untreated plots; the increase in total weight of fruit from the treated plots was not statistically significant. Treatment of a monoecious variety SMR58, gave a numerical increase in the number of fruit, and a decrease in total weight, but neither change was statistically significant.

EXAMPLE 53

Effect of O-Ethyl Hydrogen Propylphosphonate on Potatoes: Increase in Yield

Application of a plant regulator of this invention to potato plants has resulted in an increased yield of potatoes. In one experiment early potatoes (variety Irish Cobbler) were planted 12 inches apart in rows 54 inches apart and given no insecticide or fungicide treatments. Each test plot consisted of a 24 row-foot block and was treated by spraying with 10 liters of water containing the appropriate amount of active agent. One group of plots was sprayed 69 days before harvest (61 days after planting), another 30 days before harvest (100 days after planting). Treated plants showed no phytotoxicity or abnormal growth patterns during the season. Results presented in Table 11 show that yields were higher in each treated plot than in the untreated check. The largest increase, 115 percent, was obtained with 1920 grams/acre of active agent applied 30 days before harvest.

When these favorable results were obtained with during the season. Results presented in Table 12 show that all treated blocks had higher yields and larger tubers than the untreated blocks.

Other experiments with potatoes at other locations, while showing considerable variation in response according to the variety of potato and the time and rate of application, have been encouraging, and work is continuing to establish optimum conditions. A series of tests on Katahdin potatoes using two of the plant regulators of this invention is reported by G. M. Barclay and H. J. Murphy, *Research in Life Sciences* 19, No. 2, 24-28 (1971).

Table 11

Changes in Yield and Tuber Size of Irish Cobbler Potatoes
Treated with O-Ethyl Hydrogen Propylphosphonate

| Day after Planting on which Treated | Treatment Rate (g/A) | Yield[a] actual (lb/plot)[b] | Yield[a] calculated (cwt/A) | Mean Tuber Size (oz) | Yield Increase (%) |
|---|---|---|---|---|---|
| Day 61 | 30 | 29 | 118 | 3.89 | 11.5 |
|  | 120 | 38 | 115 | — | 46.2 |
|  | 480 | 39 | 159 | — | 50.0 |
| Day 100 | 30 | 38 | 155 | — | 46.2 |
|  | 120 | 46 | 188 | 4.64 | 77.0 |
|  | 480 | 35 | 143 | — | 34.7 |
|  | 960 | 42 | 172 | 4.01 | 61.6 |
|  | 1920 | 56 | 229 | — | 115.4 |
|  | 3840 | 35 | 143 | — | 34.7 |
| Check | 0 | 26[c] | 106 | 3.37 | (0) | a — Potatoes harvested on Day 130 after planting
b — Non-replicated plots consisted of 24 row-feet
c — Mean of two replicates Table 12

Changes in Yield and Tuber Size of Katahdin Potatoes
Treated with O-Ethyl Hydrogen Propylphosphonate

| Treatment[a] Rate (g/A) | Yield[b] actual (lb/plot)[c] | Yield[b] calculated (cwt/A) | No. of Tubers | Mean Tuber Size (oz) | Mean Yield Increase (%) |
|---|---|---|---|---|---|
| 120 | 88 | 375 | 291 | 4.84 |  |
|  | 86 | 366 | 322 | 4.27 | 10.1 |
| 480 | 88 | 375 | 302 | 4.66 |  |
|  | 86 | 366 | 265 | 5.19 | 10.1 |
| 960 | 90 | 383 | 325 | 4.43 |  |
|  | 91 | 388 | 296 | 4.92 | 14.6 |
| 1920 | 85 | 362 | 258 | 5.27 |  |
|  | 81 | 345 | 267 | 4.85 | 5.1 |
| 0 | 80 | 341 | 290 | 4.41 |  |
|  | 78 | 332 | 310 | 4.03 | (0) | a — Potatoes treated 114 days after planting
b — Potatoes harvested 142 days after planting
c — Randomized plots of 23 row-feet early potatoes a similar experiment was carried out with late potatoes already growing at the same site. These late potatoes (variety Katahdin) had been planted 12 inches apart in rows 54 inches apart, and given one insecticide treatment, but no fungicide treatment. Ten plots, two plots for each treatment, consisting of randomized 23 row-foot blocks were sprayed 4 weeks before harvest (16 weeks after planting) with 10 liters of water containing the appropriate amount of O-ethyl hydrogen propylphosphonate. Treated plants showed no phytotoxicity or abnormal growth patterns The plant regulators of this invention have also shown promise in increasing the yield of sugar beets. In one test treatment of sugar beets with either O-ethyl hydrogen propylphosphonate or propylphosphonic acid increased the yield in terms of sugar per acre. The following year the test was repeated at the same location, and the yield data, while directionally encouraging, were found not to be statistically significant. Tests are continuing to ascertain optimum conditions for application of the plant regulators of this invention to sugar beets.

Many other examples of active growth-controlling phosphonic acid derivatives of the class described may be prepared by procedures known or apparent to those skilled in this art and demonstrated to exhibit the useful behaviour illustrated herein. Such examples include the following, as essential active ingredients:

Example 54. O-Benzyl hydrogen propylphosphonate

Example 55. O-Phenyl hydrogen ethylphosphonate

Example 56. Calcium O-propyl propylphosphonate

Example 57. O-Cyclohexyl hydrogen propylphosphonothionate

Example 58. O-Ethyl hydrogen vinylphosphonate

Example 59. O-Methyl hydrogen 1-propenylphosphonate

Example 60. S-Ethyl hydrogen ethylphosphonodithioate

Example 61. O-Propyl propylphosphonochloridothionate

Example 62. S-Benzyl propylphosphonochloridothiolate

Example 63. S-Dodecyl ethylphosphonochloridodithioate

Example 64. Ethylphosphonic oxide

Example 65. O-Butyl hydrogen allylphosphonate

Example 66. Potassium O-isopropyl propylphosphonothiolate

Example 67. Lithium S-ethyl propylphosphonothiolate

Example 68. Sodium S-(4-chlorobenzyl) propylphosphonotrithioate

Example 69. O-Ethyl 1-hydroxypropylphosphonic acid

Example 70. 1-Hydroxyethylphosphonic acid

Example 71. Propylphosphonodithioic acid

Example 72. Ethylphosphonic dichloride

Example 73. O-Ethyl hydrogen 1-propynylphosphonate

Example 74. O-Ethyl hydrogen 2-propynylphosphonate

Example 74. Ferrous ethylphosphonate

Example 76. Ammonium O-propyl propylphosphonate

Example 77. Manganous bis(O-ethyl propylphosphonate)

Example 78. Dibutylammonium S-butyl ethylphosphonothiolate

Example 79. Cyclohexylammonium O-propyl ethylphosphonate

Example 80. Bis(trimethylammonium) 1-propenylphosphonate

For application to plants, these phosphonates are normally not used undiluted, but are combined with any of a variety of adjuvants and carriers normally employed for facilitating the dispersion of active ingredients for agricultural applications, recognizing the fact that the formulation and mode of application of a toxicant may affect the activity of that toxicant in a given application. Thus, the phosphonates may be formulated as emulsifiable concentrates, as solutions, as wettable powders, as flowable pastes, as resinous pastes, or as any of several other known types of formulations, depending on the desired mode of application. For control of established plant growth, sprays are most commonly used. Formulations suitable for use in these applications may contain as little as 0.5 percent or as much as 95 percent or more by weight of active incredient.

Emulsifiable concentrations are homogenous liquids which may be quite free-flowing or highly viscous, which are dispersible in water or other dispersant and which normally also contain a liquid carrier such as xylene, heavy aromatic naphthas, isophorone, and other non-volatile organic solvents. Solvents are homogeneous compositions in which the active ingredient is soluble in the inert liquid carrier and the combination is soluble in the final dispersant.

Wettable powders are in the form of finely divided particles which disperse readily in water or other dispersant. The wettable powder is ultimately applied to the plant growth either as a dry powder or as an emulsion in water or other liquid. Typical carriers for wettable powders include fuller's earth, kaolin clays, silicas and other highly absorbent, readily wet inorganic diluents. Wettable powders are normally prepared to contain about 5-80 percent of active ingredient, depending on the absorbency of the carrier. They usually also contain a small amount of wetting, dispersing, or emulsifying agent for facilitating dispersion. Typical wetting, dispersing, or emulsifying agents used in agricultural formulations include, for example, the alkyl and alkylarylsulfonates and sulfates and their sodium salts; polyethylene oxides; sulfonated oils; fatty acid esters; polyhydric alcohols; and other types of surface-active agents which, in formulations where they are used, normally comprise from 1 percent to 15 percent by weight of the formulation.

Resinous paste formulations are mixtures containing the active ingredient dispersed or suspended in an inert solid or semi-solid organic substance obtained as an exudate of various plant or animal matter or prepared synthetically. Typical examples of resinous organic substances employed as carriers for the active ingredient include lanolin, asphalt, agar, and paraffin. These resinous paste formulations may contain between 0.01 percent and 50 percent of active ingredient. For application, these resinous paste formulations are applied to plants directly to the locus of desired application as the concentrated formulation or may first be diluted to a desired concentration of active ingredient by admixture with additional inert carrier substance.

Flowable paste formulations are mixtures of very finely divided active ingredients suspended in an emulsifying agent or other surface-active agent in the case of the highly concentrated flowable paste, or are suspensions in mixtures of water or other dispersing liquid with the emulsifying agent. These flowable paste concentrations may contain between 10 percent and 90 percent of active ingredient.

Other useful formulations include dusts which are admixtures of the active ingredient with finely divided solids such as talc, attapulgite clays, kieselguhr, and other organic and inorganic solids which act as dispersants and carriers for the toxicants; these finely divided solids have an average particle size of less than 50 microns in diameter.

For application, these concentrated formulations are usually dispersed in water or other liquid carrier and applied as a spray to the plant growth to be treated. Or, in the case of solid formulations, application is carried out by dusting the toxicant formulation onto the plant growth to be controlled at a time when the normal leaf surface is in a condition such that the dust particles will adhere to the leaf surface.

Due to the outstanding effectiveness of the phosphonic acids and derivatives described herein to arrest the growth of woody plants without causing immediate death of the plants, these products are of particular value and utility where retardation of vegetative growth and development, without total elimination of vegetation, is desired: for example, inhibition of growth of ornamental trees or shrubs so as to provide more desirable shapes or flowering patterns, or for the treatment of brush, shrubs, and trees under power lines, along highways and railroads, and in small parks so as to reduce costs of trimming and pruning.

The compounds of this invention may be combined with other active ingredients. For example, combinations with slow-acting systemic herbicides may be used for weed and brush control, wherein the phosphonic acid derivative retards the growth of the plant while the herbicide is translocated throughout the plant to eventually kill it. The compounds of this invention may also be formulated and/or applied with insecticides, fungicides, nematicides, other plant growth regulators, fertilizers, and other agricultural chemicals. In applying these active compounds, formulated alone or with other argicultural chemicals, an effective amount and concentration of the phosphonic acid or acid derivative is of course employed.

It is apparent that various modifications may be made in the formulation and application of the novel compounds of this invention without departing from the inventive concept as defined in the following claims.

We claim:

1. Method of retarding the growth of plants which comprises applying to plants a plant retarding amount of a compound of the formula

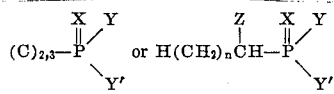

wherein $(C)_{2,3}$ is a straight-chain hydrocarbon group having two or three carbon atoms; X is oxygen or sulfur; n is 1 or 2; Z is —OH or —OCOCH$_3$; Y is halogen, —XH, or —XM wherein M is ammonium or a non-phytotoxic metallic or substituted ammonium cation; and Y' is Y or —XR wherein R is a hydrocarbon radical of 1 to 12 carbon atoms, with the proviso that Y and Y' can be taken together to represent X doubly bonded to the phosphorus atom.

2. Method of claim 1 wherein X is oxygen.
3. Method of claim 1 wherein Y is —XH or —XM.

4. Method of retarding the growth of plants which comprises applying to plants a plant retarding amount of a compound of the formula

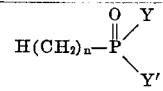

wherein n is 2 or 3; Y is chlorine, —OH, or —OM wherein M is ammonium or a non-phytotoxic metallic or substituted ammonium cation; Y' is Y or —OR; and R is a hydrocarbon radical of 1 to 12 carbon atoms with the proviso that Y and Y' can be taken together to represent oxygen doubly bonded to the phosphorus atom.

5. Method of claim 4 wherein Y and Y' taken together represent oxygen doubly bonded to the phosphorus atom.

6. Method of claim 4 wherein Y is chlorine and Y' is chlorine or -OR.

7. Method of claim 4 wherein Y is —OH or —OM.

8. Method of claim 7 wherein Y' is —OR and R is lower alkyl.

9. Method of regulating the growth of plants which comprises applying thereto a plant regulating amount of a. a compound of the formula

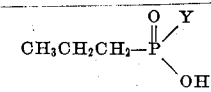

wherein Y is —OH or —OR, and R is a hydrocarbon radical of 1 to 12 carbon atoms; or b. a plant regulating metallic, ammonia, or amine salt of said compound.

10. Method of claim 9 wherein R is lower alkyl.
11. Method of claim 10 wherein the compound is O-ethyl hydrogen propylphosphonate.
12. Method of claim 10 wherein the compound is O-propyl hydrogen propylphosphonate.

* * * * *